June 25, 1929.   F. C. DE REAMER   1,718,537
CORD SET
Filed May 27, 1927
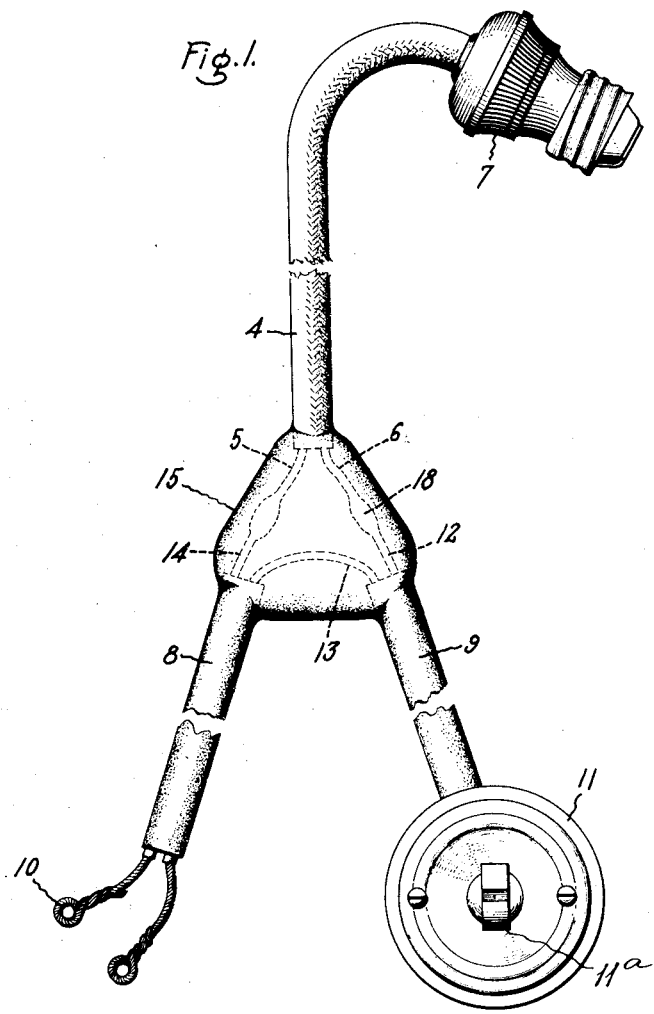
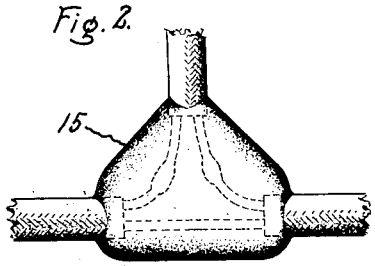
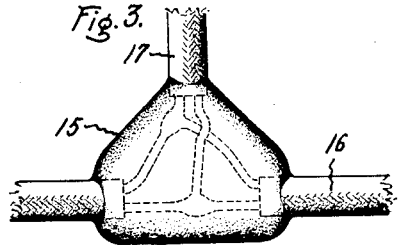
Inventor:
Frank C. De Reamer,
by His Attorney Patented June 25, 1929.

1,718,537

UNITED STATES PATENT OFFICE.

FRANK C. DE REAMER, OF BRIDGEPORT, CONNECTICUT, ASSIGNOR TO GENERAL ELECTRIC COMPANY, A CORPORATION OF NEW YORK.

CORD SET.

Application filed May 27, 1927. Serial No. 194,803.

Many types of household electrical appliances require as a part of their wiring system a long, flexible conductor cord having two separately insulated braided wires, branch conductors, a controlling switch and a means for connecting the motor or other current consuming device to the proper wires. Such wiring systems involve in assembling the removal of the insulation from a portion of the cord and splicing the proper wires together, after which each splice has to be separately insulated as by friction tape, and the splices and tapes again taped to bind the whole. Unless the taping is very well done there is danger of short-circuiting between the wires or between a wire and the metal frame of the apparatus especially when the various conductors are stretched or pulled out of their initial positions. Moreover, such a joint is unsightly even when done in the best possible manner. When conductor cord, switches and attachment plugs are sold to manufacturers of the aforesaid appliances as separate devices, there is apt to be a considerable loss of material and it usually requires a separate department to perform the various operations incident to completing the final product.

The object of my invention is to provide a cord set of the character described, which is complete and ready for instant application and in which the joints or splices between the several conductors are so thoroughly insulated by a molded soft rubber composition that danger of short-circuiting is prevented and the use of friction tape is avoided.

For a consideration of what I believe to be novel and my invention, attention is directed to the accompanying description and claim appended thereto.

In the accompanying drawing which is illustrative of my invention, Fig. 1 is a plan view of a cord set; Fig. 2 shows a series connection of the conductors; and Fig. 3 shows a multiple connection of the conductors.

4 indicates a main twin conductor cable or flexible cord and in which the conductors 5 and 6 are made of fine, braided copper wire. Each wire is separately insulated, usually with rubber, and these in turn are covered with an outer insulation usually composed of rubber over which is a braided cotton covering. This current-supplying cord is usually several feet long and is provided at its outer end with any suitable or usual form of two piece attachment plug 7 for connection to a source of current supply. 8 and 9 indicates flexible branch cords or conductors of suitable and usually comparatively short lengths, say of the order of one foot or eighteen inches, all of said cords converging toward a common point. These cords are made and insulated in the manner above referred to. For washing machines and the like where the cords are liable to be wet it is preferable to make the outer covering of the branch cords of soft rubber thereby rendering them waterproof and at the same time very flexible. At the end of one of these cords provision is made for connecting it to an electric motor or other current consuming device. As shown each wire is provided with a connector or loop 10 arranged to receive a binding screw. To the end of the other short branch cord is a snap switch 11 of any suitable construction for making and breaking the circuit between the wires 12 and 13. The switch shown is of the ordinary tumbler type and $11^a$ indicates the actuating handle. The cords 8 and 9 are usually made from one piece, the insulation being removed where the joints are to be made and the two legs bent to the desired angle. Separate cords can be used if desired. Wire 6 is spliced to wire 12 at 18 as by winding one about the other and soldering. Wire 5 is similarly connected to wire 14, the latter having originally been a part of wire 12. In other words, in this particular arrangement it is only necessary to cut one of the wires, the other 13 being bent as shown.

The various wires and their joints are then placed in a mold which is triangular in shape with the three conductors extending outwardly from the three apices. The outer insulation of the cord in each case extends into the mold to ensure complete binding. The mold is then filled with the required amount of moldable material such as rubber compound of suitable ingredients and closed, after which the mold and its contents are subjected to sufficient heat and pressure to vulcanize the rubber and form a covering 15 for the splices. The covering or enclosure 15 is substantially triangular in form and has flat top and bottom surfaces with well rounded edges. The thickness of the enclosure is approximately the same as the diameter of the outer covering of the cord insulation. The flat surfaces of the enclosure provide a suitable place for any data which it is desirable to have appear. The compound preferably should be of such a character that when the joint is completed the rubber is in a relatively soft and yieldable condition. In the vulcanizing operation the joint covering should be completely bonded to the three conductor coverings thereby preventing the entrance of moisture. Due to the molding and vulcanizing operation the several wires within the joint, their splices and the outer coverings of the cord conductors are firmly bonded in place so that bending of the conductors from their original positions in no way affects the splices and all danger of short-circuiting is avoided.

Since such joints with their enclosures or covering 15 can only be made in a factory equipped for the purpose, it follows that the joints can be made uniformly good, and that the use of friction tape and its uncertainties are entirely avoided.

The construction shown in Fig. 1 is especially intended for washing machines and is what is known as a series connection. The construction shown in Fig. 2 is also a series connection and is especially intended for sewing machines. In Fig. 3 the supply conductor 16 extends entirely through the rubber covering or joint 15 and the two wires are bared to receive the two wires from the branch conductor 17. In this case the ends of the wires in conductor 17 are connected in multiple with those in the conductor 16. As in the other figures the splices and adjacent ends of the conductor coverings are enclosed in a moldable composition such as soft rubber. Soft rubber for the joint covering is particularly adapted for the purpose because it is a good insulator and freely unites with the soft rubber used to insulate the wires; it has sufficient elasticity to permit of the conductors being bent without injury even though the bends are quite sharp and it will not mar the finish of any article on which the cord set is used. Furthermore, the covering itself may be bent without injury to the joints and to the conductors.

What I claim as new and desire to secure by Letters Patent of the United States is:

As an article of manufacture, a cord set comprising three conductor cords, each comprising a pair of separately-insulated conductors and an overall insulating covering, an attaching plug which is electrically connected to the outer end of one of the cords, a switch which is connected to the outer end of the second cord, provision at the outer end of the third cord for connection to a current-consuming device, said cords at their inner ends extending toward a common point where certain of the wires are spliced, and a soft, vulcanized rubber covering which completely envelops the splices and a small portion of the cord insulations adjacent the splices and is bonded to the insulations, said covering being limited to that portion of the set immediately enclosing the splices.

In witness whereof, I have hereunto set my hand this 25th day of May, 1927.

FRANK C. DE REAMER.